US006836307B2

(12) United States Patent
Itoh

(10) Patent No.: US 6,836,307 B2
(45) Date of Patent: Dec. 28, 2004

(54) PROCESS OF PRODUCING MULTICOLOR OPTICAL ELEMENT

(75) Inventor: Norihito Itoh, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 35 days.

(21) Appl. No.: 10/185,715

(22) Filed: Jul. 1, 2002

(65) Prior Publication Data

US 2003/0025858 A1 Feb. 6, 2003

(30) Foreign Application Priority Data

Jul. 5, 2001 (JP) ........................................ 2001-204482

(51) Int. Cl.[7] ............................................. G02F 1/1335
(52) U.S. Cl. ...................... 349/115; 349/98; 349/176; 349/187; 349/194; 349/2; 430/20
(58) Field of Search .......................... 349/115, 98, 176, 349/194, 187, 20–22, 2; 430/20

(56) References Cited

U.S. PATENT DOCUMENTS

| | | | | |
|---|---|---|---|---|
| 6,043,861 A | * | 3/2000 | Davis | 349/193 |
| 6,204,899 B1 | * | 3/2001 | Hall | 349/65 |
| 6,573,963 B2 | * | 6/2003 | Ouderkirk et al. | 349/117 |
| 6,636,291 B2 | * | 10/2003 | Van De Witte et al. | 349/187 |

FOREIGN PATENT DOCUMENTS

| | | |
|---|---|---|
| JP | 59-083113 | 5/1984 |
| JP | 10-054905 | 2/1998 |
| JP | 11-153798 | 6/1999 |
| JP | 2001-100045 | 4/2001 |
| WO | 00/34808 | 6/2000 |

\* cited by examiner

Primary Examiner—Steven S. Paik
(74) Attorney, Agent, or Firm—Parkhurst & Wendel, L.L.P.

(57) ABSTRACT

A cholesteric liquid crystal coating film 13' is formed on an alignment layer 12 provided on a glass substrate 11 (FIG. 1(a)), and is subjected to a thermal alignment process at a temperature equal to or higher than the liquid crystalline phase transition temperature of a chiral nematic liquid crystal that constitutes the coating film (FIG. 1(b)). Active rays capable of activating optically active groups in the chiral nematic liquid crystal are applied to the cholesteric liquid crystal coating film 13' to deactivate the optically active groups, thereby forming a cholesteric layer 13 having color-indicating regions with the desired areas and indication colors that have been created according to the active-rays-applied area and to the amount of active rays applied to the area (FIG. 1(c)). Thereafter, this cholesteric layer 13 is subjected to a thermal alignment process at a temperature lower than the liquid crystalline phase transition temperature of the chiral nematic liquid crystal (FIG. 1(d)). Lastly, a predetermined amount of ultraviolet light was applied to the cholesteric layer 13 in an atmosphere in which the optically active groups are inactive, thereby three-dimensionally crosslinking the cholesteric layer 13 for curing (FIG. 1(e)).

10 Claims, 2 Drawing Sheets

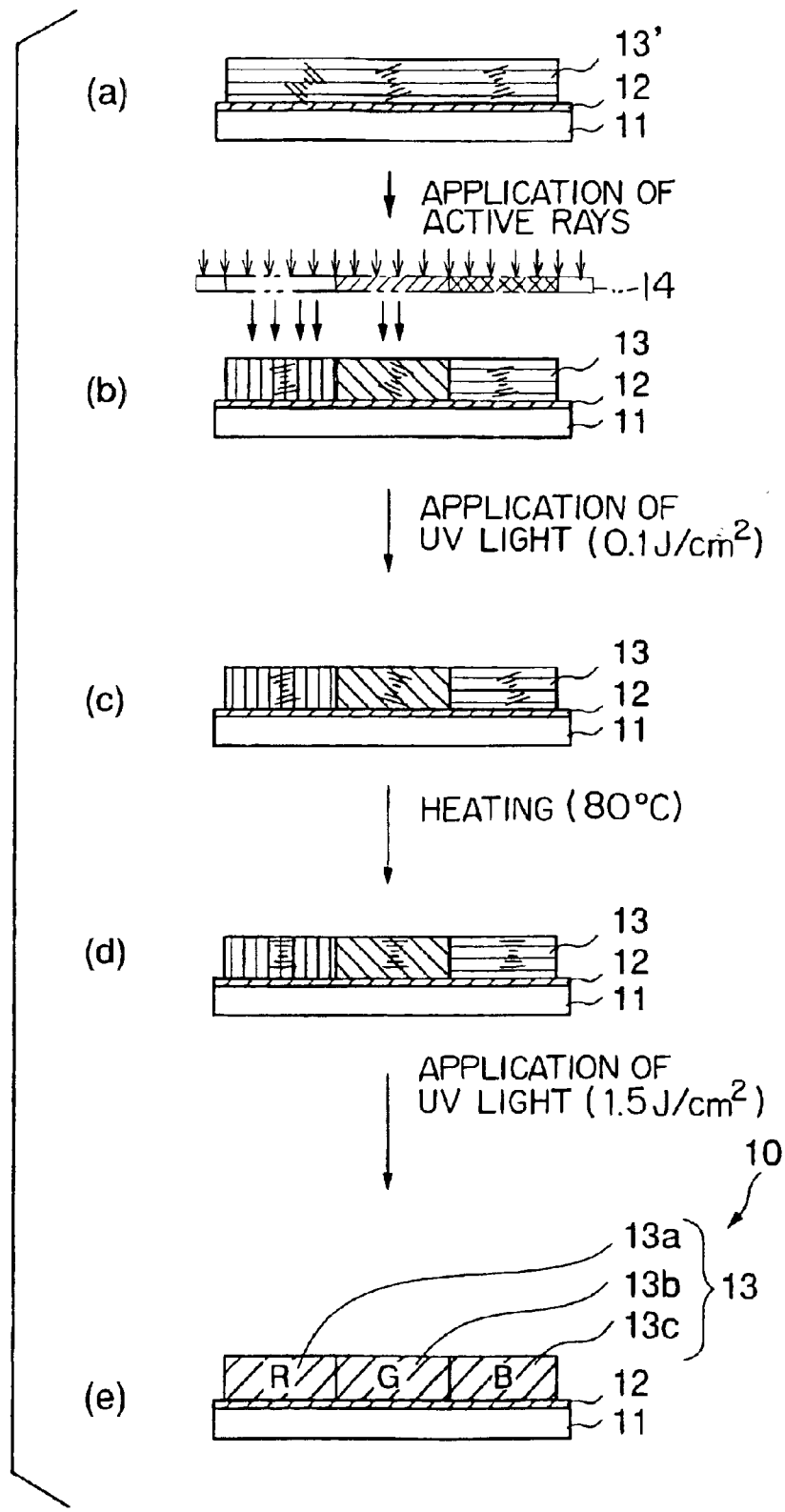
F I G. 2

PROCESS OF PRODUCING MULTICOLOR OPTICAL ELEMENT

BACKGROUND OF THE INVENTION

1. Field of the Invention

The present invention relates to a process of producing a multicolor optical element suitable for use in a liquid crystal display apparatus or the like to attain color display. More particularly, the present invention relates to a process of producing a multicolor optical element comprising a liquid crystal having a cholesteric regularity.

2. Related Art

Multicolor-indicating plates, color filters, polarizing elements, etc., have conventionally been known as multicolor optical elements comprising a liquid crystal having a cholesteric regularity. In the field of such multicolor optical elements, a method in which colored layers with predetermined areas and indication colors (e.g., red (R), green (G) and blue (B)) are photolithographically formed one by one as color-indicating regions, as described in Japanese Laid-Open Patent Publication No. 153798/1999, has been known as a method for obtaining the desired multicolored pattern. Japanese Laid-Open Patent Publication No. 83113/1984 describes such a method that the indication color of each color-indicating region is individually adjusted by controlling temperature.

However, the above method described in Japanese Laid-Open Patent Publication No. 153798/1999 is disadvantageous in that it requires increased production cost. This is because, in this method, it is necessary to repeat the photolithographic process the same number of times as the number of the indication colors of color-indicating regions required. The method described in Japanese Laid-Open Patent Publication No. 83113/1984 also has the following shortcomings: since the indication colors of color-indicating regions are adjusted by controlling temperature, the production process is inevitably complicated; and moreover, the boundaries between the color-indicating regions (color divisions) become unclear, making it difficult to create fine color-indicating regions.

In the meantime, International Laid-Open Patent Publication WO 00/34808 describes a method for forming a cholesteric layer (layer having a cholesteric regularity) bearing a predetermined multicolored pattern by applying active rays to a liquid crystal layer having a cholesteric regularity, containing, as its constituents, monomers having optically active groups so as to deactivate these optically active groups. Specifically, in this method, a cholesteric layer having color-indicating regions with predetermined areas and indication colors that have been created according to the active-rays-applied area and to the amount of active rays applied to the area is firstly made, and ultraviolet light having a wavelength at which the optically active groups are inactive is then applied to the cholesteric layer to fix the areas and indication colors of the color-indicating regions. According to this method, it becomes possible to obtain a cholesteric layer having a predetermined multicolored pattern in one photolithographic step if a photomask composed of regions having different transmittances is used to control the amount of active rays that reach to each color-indicating region to be created. Therefore, the production process is simplified; and in addition, it is easy to create fine color-indicating regions.

However, the above method described in International Laid-Open Patent Publication WO 00/34808 has such a drawback that: since the planar alignment of molecules in a cholesteric layer is readily disordered by the application of active rays, it is impossible to create color-indicating regions whose indication colors are excellent in intensity of color (color purity).

A method in which a cholesteric layer is subjected to a thermal alignment process at a temperature equal to or higher than the liquid crystalline phase transition temperature of a liquid crystal that constitutes the cholesteric layer has been known as a method usually used to align liquid crystalline molecules in a cholesteric layer (planar alignment). If this method is applied to a cholesteric layer bearing color-indicating regions created in a predetermined pattern by the application of active rays, the boundaries between the color-indicating regions (color divisions) become unclear due to thermal diffusion of the liquid crystalline molecules that occurs at the interface between each two color-indicating regions. It is thus difficult to obtain fine color-indicating regions by this method.

SUMMARY OF THE INVENTION

The present invention was accomplished in order to overcome the above-described shortcomings in the related art. An object of the present invention is therefore to provide a process of producing a multicolor optical element, by which a multicolor optical element containing fine color-indicating regions whose indication colors are excellent in intensity of color (color purity) can simply be produced at low cost.

The present invention provides, as a first embodiment, a process of producing a multicolor optical element, comprising the steps of: preparing a liquid crystal layer comprising a liquid crystal having a cholesteric regularity, the liquid crystal containing, as its constituents, monomers having optically active groups; applying active rays to the liquid crystal layer to deactivate the optically active groups, thereby forming a cholesteric layer having color-indicating regions with the desired areas and indication colors that have been created according to the active-rays-applied area and to the amount of active rays applied to the area; subjecting the cholesteric layer having the color-indicating regions to a thermal alignment process at a temperature lower than the liquid crystalline phase transition temperature of the liquid crystal; and three-dimensionally crosslinking this cholesteric layer for curing.

The present invention provides, as a second embodiment, a process of producing a multicolor optical element, comprising the steps of: preparing a liquid crystal layer comprising a liquid crystal having a cholesteric regularity, the liquid crystal containing, as its constituents, monomers having optically active groups; applying active rays to the liquid crystal layer to deactivate the optically active groups, thereby forming a cholesteric layer having color-indicating regions with the desired areas and indication colors that have been created according to the active-rays-applied area and to the amount of active rays applied to the area; partially three-dimensionally crosslinking the cholesteric layer having the color-indicating regions; subjecting the partially three-dimensionally crosslinked cholesteric layer to a thermal alignment process at a temperature equal to or higher than the liquid crystalline phase transition temperature of the liquid crystal; and three-dimensionally crosslinking this cholesteric layer for curing.

In the above-described first and second embodiments of the present invention, it is preferable that the processes further comprise, before the step of applying active rays to the liquid crystal layer, the step of subjecting the liquid crystal layer to a thermal alignment process at a temperature equal to or higher than the liquid crystalline phase transition temperature of the liquid crystal. It is also preferable that the cholesteric layer having color-indicating regions with the desired areas and indication colors that have been created according to the active-rays applied area and to the amount of active rays applied to the area be formed by applying active rays through a photomask composed of regions that have different transmittances and areas corresponding to color-indicating regions to be created. It is also preferable that the active rays be ultraviolet rays. In addition, the liquid crystal constituting the cholesteric layer is preferably a chiral nematic liquid crystal, and it is preferable that the cholesteric layer subjected to the thermal alignment process be three-dimensionally crosslinked and cured by the application of ultraviolet rays or electron beams.

According to the first embodiment of the present invention, active rays are applied to a liquid crystal layer comprising a liquid crystal having a cholesteric regularity, containing, as its constituents, monomers having optically active groups, thereby forming a cholesteric layer having color-indicating regions with the desired areas and indication colors that have been created according to the active-rays-applied area and to the amount of active rays applied to the area; and this cholesteric layer is then subjected to a thermal alignment process at a temperature lower than the liquid crystalline phase transition temperature of the liquid crystal that constitutes the cholesteric layer. It is therefore possible to effectively align the liquid crystalline molecules in the cholesteric layer (planar alignment) while effectively preventing thermal diffusion of the liquid crystalline molecules that occurs at the interface between each two color-indicating regions. A multicolor optical element containing fine color-indicating regions whose indication colors are excellent in intensity of color (color purity) can thus simply be produced at low cost.

According to the second embodiment of the present invention, active rays are applied to a liquid crystal layer comprising a liquid crystal having a cholesteric regularity, containing, as its constituents, monomers having optically active groups, thereby forming a cholesteric layer having color-indicating regions with the desired areas and indication colors that have been created according to the active-rays-applied area and to the amount of active rays applied to the area; this cholesteric layer is then partially three-dimensionally crosslinked; and the partially three-dimensionally crosslinked cholesteric layer is subjected to a thermal alignment process at a temperature equal to or higher than the liquid crystalline phase transition temperature of the liquid crystal that constitutes the cholesteric layer.

It is therefore possible to effectively align the liquid crystalline molecules in the cholesteric layer (planar alignment) while effectively preventing thermal diffusion of the liquid crystalline molecules that occurs at the interface between each two color-indicating regions. A multicolor optical element containing fine color-indicating regions whose indication colors are excellent in intensity of color (color purity) can thus simply be produced at low cost.

BRIEF DESCRIPTION OF THE DRAWINGS

In the drawings,

FIG. 2 is a process chart illustrating a second embodiment of the process of producing a multicolor optical element according to the present invention.

DESCRIPTION OF THE PREFERRED EMBODIMENTS

Figure 1:
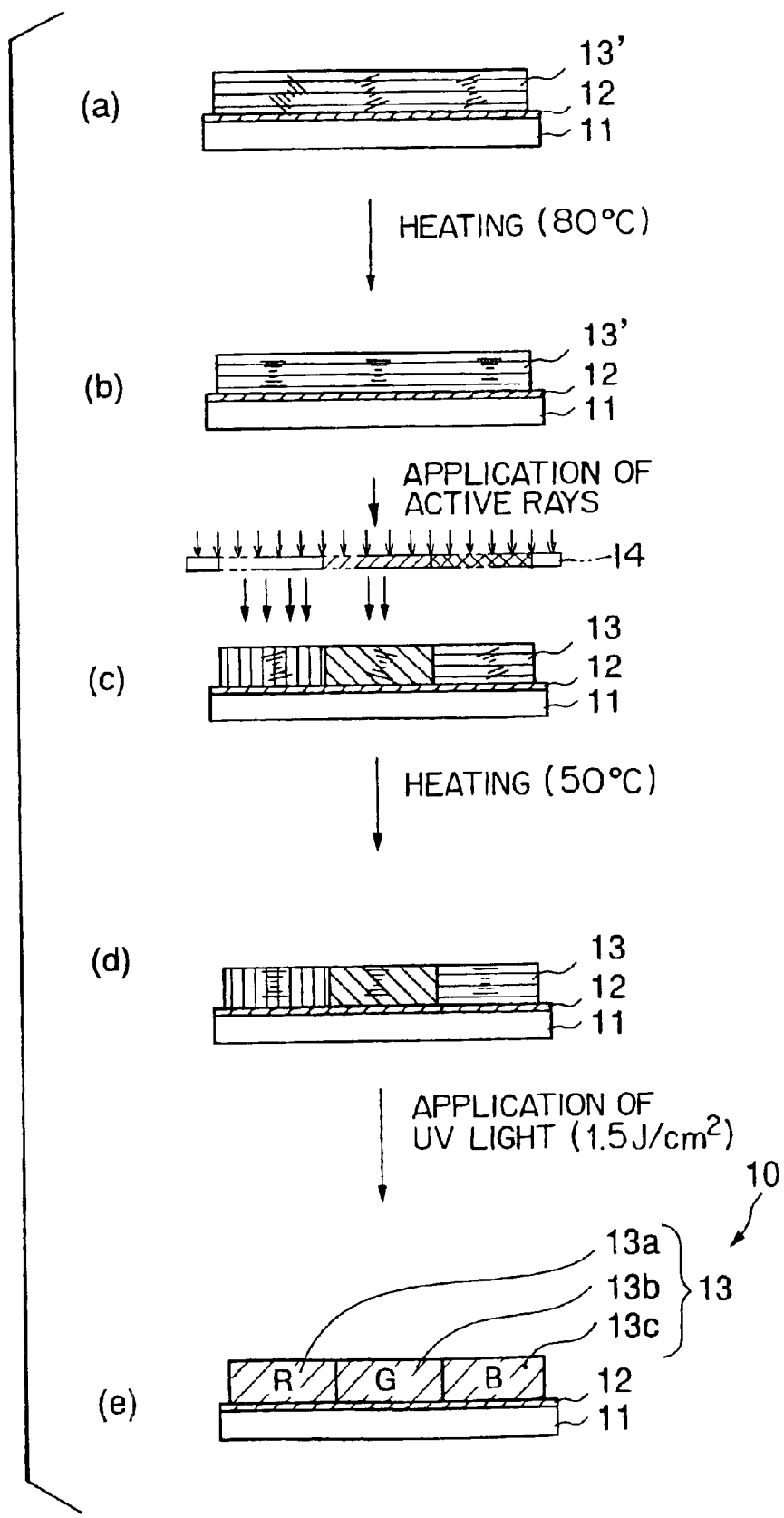
FIG. 1 is a process chart illustrating a first embodiment of the process of producing a multicolor optical element according to the present invention.

By referring to the accompanying drawings, embodiments of the present invention will be described hereinafter.
First Embodiment A first embodiment of the process of producing a multicolor optical element according to the present invention will be described by referring to FIG. 1. In this embodiment, a multicolor-indicating plate bearing color-indicating regions for three indication colors of red (R), green (G) and blue (B) is taken as an example of the multicolor optical element.

As shown in FIG. 1(a), an alignment layer 12 is formed on a glass substrate 11 and is rubbed to align the molecules at its surface. This alignment layer 12 is then coated with a low-molecular-weight chiral nematic liquid crystal having a cholesteric regularity, containing, as its constituents, monomers having optically active groups, thereby forming a cholesteric liquid crystal coating film 13'.

It is noted that the chiral nematic liquid comprises a nematic liquid crystal and a chiral agent; and the nematic liquid crystal may be a chemical compound represented by any of the following chemical formulas:

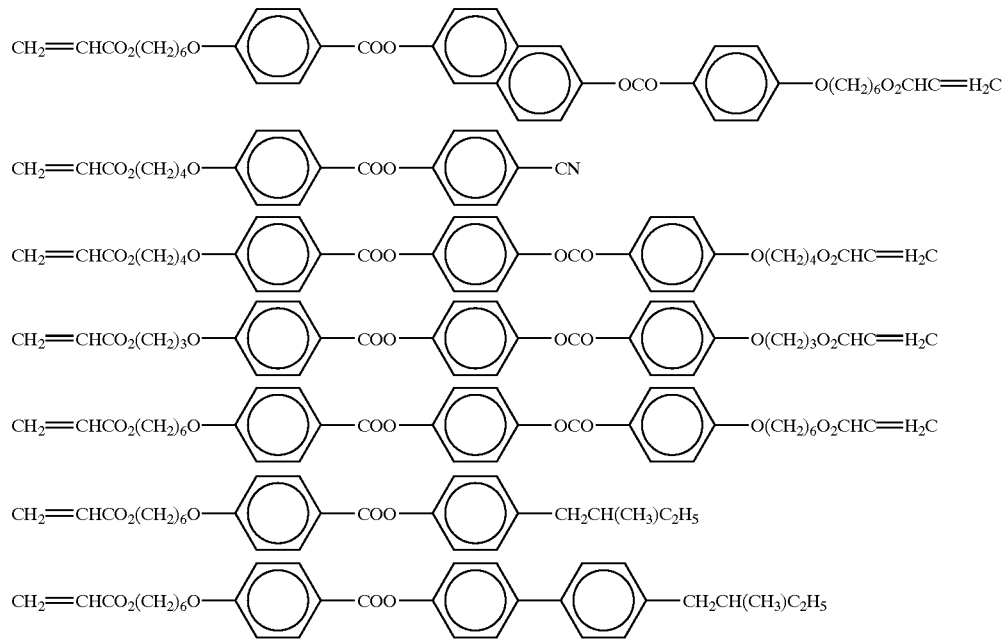

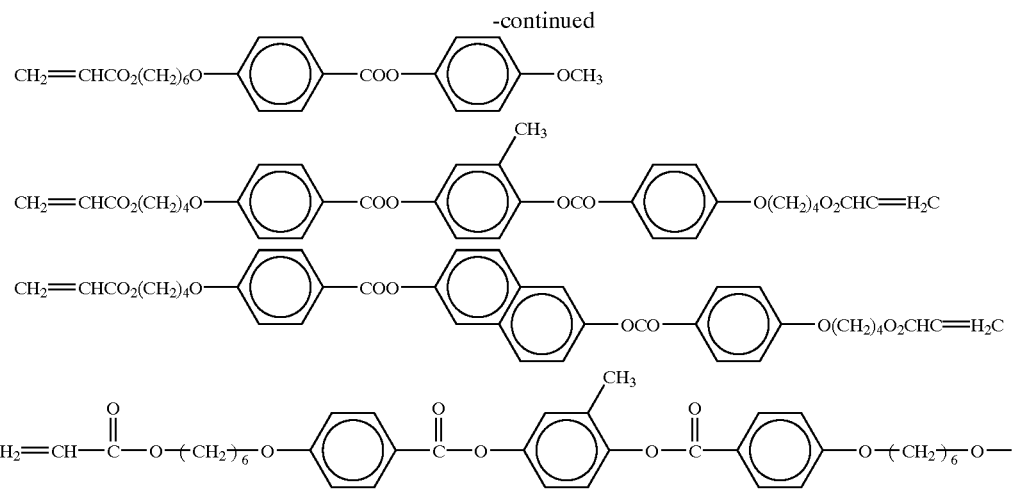

On the other hand, the chiral agent may be a chemical compound represented by the following formulas:

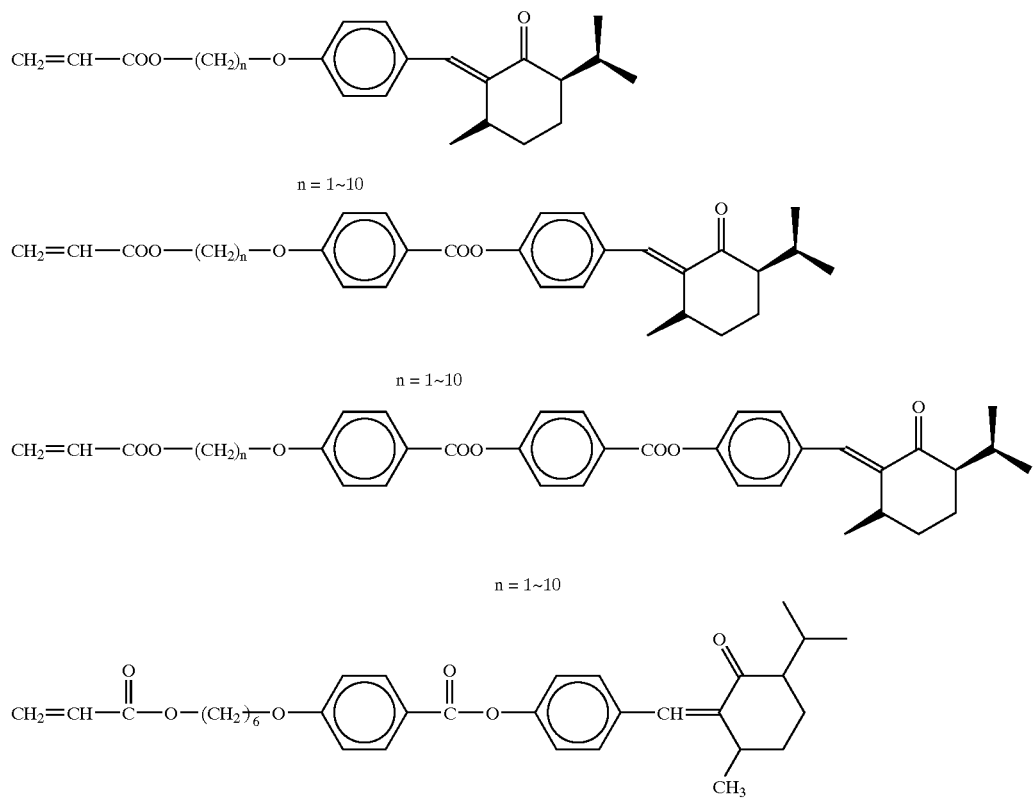

Next, as shown in FIG. 1(b), the cholesteric liquid crystal coating film 13' is heated at a temperature (e.g., 80° C.) equal to or higher than the liquid crystalline phase transition temperature of the chiral nematic liquid crystal for a predetermined period of time (e.g., for 15 seconds), thereby aligning the chiral nematic liquid crystalline molecules by the alignment-regulating action of the surface of the alignment layer 12.

Thereafter, as shown in FIG. 1(c), active rays (e.g., ultraviolet light in an atmospheric environment) capable of activating the optically active groups are applied to the cholesteric liquid crystal coating film 13' through a photomask 14 composed of regions that have different transmittances and areas corresponding to color-indicating regions to be created so as to deactivate the optically active groups in the chiral nematic liquid crystal, thereby forming a cholesteric layer 13 having color-indicating regions with the desired areas and indication colors that have been created according to the active-rays-applied area and to the amount of active rays applied to the area.

As shown in FIG. 1(d), the cholesteric layer 13 having the color-indicating regions is heated at a temperature (e.g., 50° C.) lower than the liquid crystalline phase transition temperature of the chiral nematic liquid crystal for a predetermined period of time (e.g., for 60 seconds), thereby aligning the chiral nematic liquid crystalline molecules by the alignment-regulating action of the surface of the alignment layer 12.

Lastly, as shown in FIG. 1(*e*), a predetermined amount (e.g., 1.5 J/cm$^2$) of ultraviolet light having a wavelength at which the optically active groups are inactive is applied to the cholesteric layer 13 that has been subjected to the thermal alignment process, thereby three-dimensionally crosslinking the cholesteric layer 13; the cholesteric layer 13 is thus polymerized and cured. To cure the chiral nematic liquid crystal, electron beams may also be applied instead of ultraviolet light. The term "three-dimensional crosslinking" herein means that liquid crystalline molecules are three-dimensionally polymerized to form a network structure. If such a structure is formed, the state of the liquid crystalline molecules is optically fixed; there can thus be obtained a film that is easy to handle as an optical film and that is stable at normal temperatures. As shown in FIG. 1(*e*), the finally obtained cholesteric layer 13 bears the color-indicating regions for three indication colors (red-indicating region (R) 13*a*, green-indicating region (G) 13*b* and blue-indicating region (B) 13*c*).

Thus, according to this first embodiment, active rays are applied to the cholesteric liquid crystal coating film 13' to form the cholesteric layer 13 having color-indicating regions with the desired areas and indication colors that have been created according to the active-rays-applied area and to the amount of active rays applied to the area; and this cholesteric layer 13 is then subjected to a thermal alignment process at a temperature lower than the liquid crystalline phase transition temperature of the chiral nematic liquid crystal. It is therefore possible to effectively align the liquid crystalline molecules in the cholesteric layer (planar alignment) while effectively preventing thermal diffusion of the liquid crystalline molecules that occurs at the interface between each two color-indicating regions. A multicolor optical element containing fine color-indicating regions whose indication colors are excellent in intensity of color (color purity) can thus simply be produced at low cost.

Further, according to this first embodiment, prior to the application of active rays, the cholesteric liquid crystal coating film 13' is subjected to the thermal alignment process at a temperature equal to or higher than the liquid crystalline phase transition temperature of the chiral nematic liquid crystal. Therefore, the thermal alignment process that comes after the step of applying active rays to the cholesteric liquid crystal coating film 13' can be conducted at a relatively low temperature. It is thus possible to more effectively prevent thermal diffusion of the liquid crystalline molecules that occurs at the interface between each two color-indicating regions.

Second Embodiment

In the aforementioned first embodiment of the present invention, in order to effectively prevent thermal diffusion of the liquid crystalline molecules that occurs at the interface between each two color-indicating regions, the cholesteric layer 13 to which the active rays have been applied is subjected to a thermal alignment process at a temperature lower than the liquid crystalline phase transition temperature of the chiral nematic liquid crystal. Instead of this manner, there may also be adopted such a manner that: after partially three-dimensionally crosslinking the cholesteric layer 13 having the color-indicating regions, the partially three-dimensionally crosslinked cholesteric layer 13 is subjected to a thermal alignment process at a temperature equal to or higher than the liquid crystalline phase transition temperature of the chiral nematic liquid crystal, as shown in FIG. 2.

Specifically, as shown in FIG. 2(*a*), an alignment layer 12 is formed on a glass substrate 11 and is rubbed to align the molecules at its surface. This alignment layer 12 is then coated with a low-molecular-weight chiral nematic liquid crystal having a cholesteric regularity, containing, as its constituents, monomers having optically active groups, thereby forming a cholesteric liquid crystal coating film 13'.

Next, as shown in FIG. 2(*b*), active rays (e.g., ultraviolet light in an atmospheric environment) capable of activating the optically active groups are applied to the cholesteric liquid crystal coating film 13' through a photomask 14 composed of regions that have different transmittances and areas corresponding to color-indicating regions to be created so as to deactivate the optically active groups in the chiral nematic liquid crystal, thereby forming a cholesteric layer 13 having color-indicating regions with the desired areas and indication colors that have been created according to the active-rays-applied area and to the amount of active rays applied to the area.

Thereafter, as shown in FIG. 2(*c*), a predetermined amount (e.g., 0.1 J/cm$^2$) of ultraviolet light is applied, in an atmosphere in which the optically active groups are inactive, to the cholesteric layer 13 having the color-indicating regions, thereby partially three-dimensionally crosslinking the cholesteric layer 13.

As shown in FIG. 2(*d*), the cholesteric layer 13 to which a predetermined amount of ultraviolet light has been applied is heated at a temperature (e.g., 80° C.) equal to or higher than the liquid crystalline phase transition temperature of the chiral nematic liquid crystal for a predetermined period of time (e.g., for 15 seconds), thereby aligning the chiral nematic liquid crystalline molecules by the alignment-regulation action of the surface of the alignment layer 12.

Lastly, as shown in FIG. 2(*e*), a predetermined amount of ultraviolet light (e.g., 1.5 J/cm$^2$) having a wavelength at which the optically active groups are inactive is applied to the cholesteric layer 13 that has been subjected to the thermal alignment process, thereby three-dimensionally crosslinking the cholesteric layer 13; the cholesteric layer 13 is thus polymerized and cured. To cure the chiral nematic liquid crystal, electron beams may also be applied instead of ultraviolet light. As shown in FIG. 2(*e*), the finally obtained cholesteric layer 13 bears the color-indicating regions for three indication colors (red-indicating region (R) 13*a*, green-indicating region (G) 13*b* and blue-indicating region (B) 13*c*).

Thus, according to this second embodiment of the invention, active rays are applied to the cholesteric liquid crystal coating film 13' to form the cholesteric layer 13 having color-indicating regions with the desired areas and indication colors that have been created according to the active-rays-applied area and to the amount of active rays applied to the area; this cholesteric layer 13 is then partially three-dimensionally crosslinked; and the partially three-dimensionally crosslinked cholesteric layer 13 is then subjected to a thermal alignment process at a temperature equal to or higher than the liquid crystalline phase transition temperature of the chiral nematic liquid crystal. It is therefore possible to effectively align the liquid crystalline molecules in the cholesteric layer 13 (planar alignment) while effectively preventing thermal diffusion of the liquid crystalline molecules that occurs at the interface between each two color-indicating regions. A multicolor optical element containing fine color-indicating regions whose indication colors are excellent in intensity of color (color purity) can thus simply be produced at low cost.

In the above-described second embodiment of the present invention, active rays are applied to the cholesteric liquid crystal coating film 13' immediately after the formation of this coating film 13' on the alignment layer 12 provided on the glass substrate 11. However, before applying active rays, the cholesteric liquid crystal coating film 13' may be heated at a temperature (e.g., 80°) equal to or higher than the liquid crystalline phase transition temperature of the chiral nematic liquid crystal for a predetermined time (e.g., for 15 seconds) like in the first embodiment shown in FIG. 1.

EXAMPLES

The aforementioned embodiments of the present invention will now be explained more specifically by referring to the following Examples and Comparative Example.

Example 1

A 40 wt. % toluene solution was prepared by dissolving, in toluene, 85% by weight of a monomer having a liquid crystalline phase transition temperature of 80° C., represented by the following chemical formula (1):

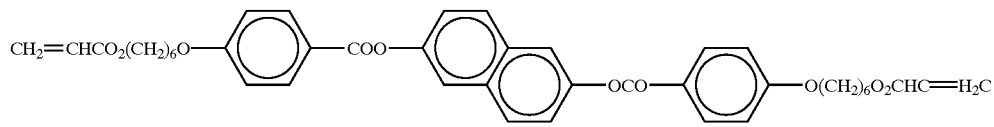

(1)

14% by weight of a monomer having optically active groups, represented by the following chemical formula (2):

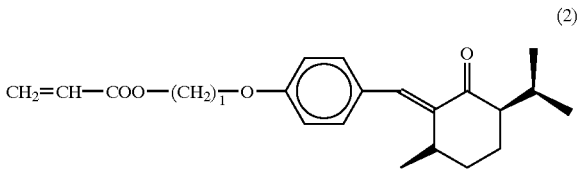

(2)

and 1% by weight of a photopolymerization initiator (Darocure 4265).

Separately, a polyimide film (alignment layer) having a thickness of 0.1 $\mu$m was formed on a glass substrate and was rubbed in one direction to align the molecules at its surface.

Next, the glass substrate coated with this polyimide film was set in a spin coater; and the above-prepared toluene solution was applied to the polyimide film so that the thickness of the resulting coating film would be 4 $\mu$m, thereby forming a cholesteric liquid crystal coating film. This cholesteric liquid crystal coating film was heated at 80° C. for 15 seconds to evaporate the toluene contained in the toluene solution, and, at the same time, to align the liquid crystalline molecules. A blue reflector having a selective reflection wave range with a center wavelength of 460 nm was thus obtained.

Thereafter, in an atmospheric environment, 0.4 J/cm$^2$ of ultraviolet light having a wavelength of 365 nm was applied to the cholesteric liquid crystal coating film through a photomask composed of three regions having transmittances of 100%, 50% and 0%, arranged in stripes with a pitch of 100 $\mu$m. The cholesteric liquid crystal coating film was then heated at 50° C. for 60 seconds to align the liquid crystalline molecules.

Lastly, in a nitrogen atmosphere, 1.5 J/cm$^2$ of ultraviolet light having a wavelength of 405 nm was applied to the cholesteric liquid crystal coating film (cholesteric layer) for curing.

A multicolor reflector having the color-indicating regions created in stripes (the central wavelengths of the selective reflection wave ranges: 650 nm (red), 550 nm (green) and 460 nm (blue)) was thus obtained.

Example 2

A 40 wt. % toluene solution was prepared by dissolving, in toluene, 85% by weight of a monomer having a liquid crystalline phase transition temperature of 80° C., represented by the above chemical formula (1), 14% by weight of a monomer having optically active groups, represented by the above chemical formula (2), and 1% by weight of a photopolymerization initiator (Darocure 4265).

Separately, a polyimide film (alignment layer) having a thickness of 0.1 $\mu$m was formed on a glass substrate and was rubbed in one direction to align the molecules at its surface.

Next, the glass substrate coated with this polyimide film was set in a spin coater; and the above-prepared toluene solution was applied to the polyimide film so that the thickness of the resulting coating film would be 4 $\mu$m, thereby forming a cholesteric liquid crystal coating film. This cholesteric liquid crystal coating film was heated at 80° C. for 15 seconds to evaporate the toluene contained in the toluene solution, and, at the same time, to align the liquid crystalline molecules. A blue reflector having a selective reflection wave range with a center wavelength of 460 nm was thus obtained.

Thereafter, in an atmospheric environment, 0.4 J/cm$^2$ of ultraviolet light having a wavelength of 365 nm was applied to the cholesteric liquid crystal coating film through a photomask composed of three regions having transmittances of 100%, 50% and 0%, arranged in stripes with a pitch of 100 $\mu$m. Subsequently, in a nitrogen atmosphere, 0.1 J/cm$^2$ of ultraviolet light having a wavelength of 405 nm was applied to the cholesteric liquid crystal coating film to partially three-dimensionally cross-link it. This cholesteric liquid crystal coating film (cholesteric liquid crystal layer) was heated at 80° C. for 15 seconds to align the liquid crystalline molecules.

Lastly, in a nitrogen atmosphere, 1.5 J/cm$^2$ of ultraviolet light having a wavelength of 405 nm was applied to the cholesteric liquid crystal coating film (cholesteric layer) for curing.

A multicolor reflector having the color-indicating regions created in stripes (the central wavelengths of the selective reflection wave ranges: 650 nm (red), 550 nm (green) and 460 nm (blue)) was thus obtained.

Comparative Example

A 40 wt. % toluene solution was prepared by dissolving, in toluene, 85% by weight of a monomer having a liquid crystalline phase transition temperature of 80° C., represented by the above chemical formula (1), 14% by weight of a monomer having optically active groups, represented by the above chemical formula (2), and 1% by weight of a photopolymerization initiator (Darocure 4265).

Separately, a polyimide film (alignment layer) having a thickness of 0.1 $\mu$m was formed on a glass substrate and was rubbed in one direction to align the molecules at its surface.

Next, the glass substrate coated with this polyimide film was set in a spin coater, and the above-prepared toluene solution was applied to the polyimide film so that the thickness of the resulting coating film would be 4 μm, thereby forming a cholesteric liquid crystal coating film. This cholesteric liquid crystal coating film was heated at 80° C. for 15 seconds to evaporate the toluene contained in the toluene solution, and, at the same time, to align the liquid crystalline molecules. A blue reflector having a selective reflection wave range with a center wavelength of 460 nm was thus obtained.

Thereafter, in an atmospheric environment, 0.4 J/cm$^2$ of ultraviolet light having a wavelength of 365 nm was applied to the cholesteric liquid crystal coating film through a photomask composed of three regions having transmittances of 100%, 50% and 0%, arranged in stripes with a pitch of 100 μm. The cholesteric liquid crystal coating film was then heated to 80° C. for 15 seconds to align the liquid crystalline molecules.

Lastly, in a nitrogen atmosphere, 1.5 J/cm$^2$ of ultraviolet light having a wavelength of 405 nm was applied to the cholesteric liquid crystal coating film (cholesteric layer) for curing.

A multicolor reflector having the color-indicating regions created in stripes (the central wavelengths of the selective reflection wave ranges: 650 nm (red), 550 nm (green) and 460 nm (blue)) was thus obtained.

Results of Evaluation

With respect to the multicolor reflectors of Examples 1 and 2, the color-indicating regions created in stripes were respectively found to have an effective line width of 100 μm and to indicate colors excellent in intensity of color (color purity).

Regarding the multicolor reflector of Comparative Example, on the other hand, the color-indicating regions created in stripes were found to have an effective line width of 50 μm only; and the boundaries between each two color-indicating regions (color divisions) were unclear.

What is claimed is:

1. A process of producing a multicolor optical element, comprising the steps of:
   preparing a liquid crystal layer comprising a liquid crystal having a cholesteric regularity, the liquid crystal containing monomers having optically active groups;
   applying an active ray to the liquid crystal layer to deactivate the optically active groups, thereby forming a cholesteric layer having color-indicating regions with desired areas and indication colors created according to an applied area of the active ray and to an amount of active ray applied to the area;
   subjecting the cholesteric layer having the color-indicating regions to a thermal alignment process at a temperature lower than a liquid crystalline phase transition temperature of the liquid crystal; and
   three-dimensionally crosslinking and curing the cholesteric layer subjected to the thermal alignment process.

2. The process according to claim 1, further comprising, before the step of applying the active ray to the liquid crystal layer, the step of subjecting the liquid crystal layer to a thermal alignment process at a temperature equal to or higher than the liquid crystalline phase transition temperature of the liquid crystal.

3. The process according to claim 1, wherein the cholesteric layer having the color-indicating regions is formed by applying an active ray to the liquid crystal layer through a photomask including regions that have different transmittances and areas corresponding to the color-indicating regions to be created.

4. The process according to claim 1, wherein the active ray is an ultraviolet ray.

5. The process according to claim 1, wherein the liquid crystal constituting the cholesteric layer is a chiral nematic liquid crystal, and the cholesteric layer subjected to the thermal alignment process is three-dimensionally crosslinked and cured by application of an ultraviolet ray or an electron beam.

6. A process of producing a multicolor optical element, comprising the steps of:
   preparing a liquid crystal layer comprising a liquid crystal having a cholesteric regularity, the liquid crystal containing monomers having optically active groups;
   applying an active ray to the liquid crystal layer to deactivate the optically active groups, thereby forming a cholesteric layer having color-indicating regions with desired areas and indication colors created according to an applied area of the active ray and to an amount of active ray applied to the area;
   partially three-dimensionally crosslinking and curing the cholesteric layer having the color-indicating regions;
   subjecting the partially three-dimensionally crosslinked cholesteric layer to a thermal alignment process at a temperature equal to or higher than a liquid crystalline phase transition temperature of the liquid crystal; and
   three-dimensionally crosslinking and curing the cholesteric layer subjected to the thermal alignment process.

7. The process according to claim 6, further comprising, before the step of applying the active ray to the liquid crystal layer, the step of subjecting the liquid crystal layer to a thermal alignment process at a temperature equal to or higher than the liquid crystalline phase transition temperature of the liquid crystal.

8. The process according to claim 6, wherein the cholesteric layer having the color-indicating regions is formed by applying an active ray to the liquid crystal layer through a photomask including regions that have different transmittances and areas corresponding to the color-indicating regions to be created.

9. The process according to claim 6, wherein the active ray is an ultraviolet ray.

10. The process according to claim 6, wherein the liquid crystal constituting the cholesteric layer is a chiral nematic liquid crystal, and the cholesteric layer subjected to the thermal alignment process is three-dimensionally crosslinked and cured by application of an ultraviolet ray or an electron beam.

* * * * *